United States Patent [19]

Tsui et al.

[11] Patent Number: 5,746,552
[45] Date of Patent: May 5, 1998

[54] ADJUSTABLE DRILL BUSHING

[76] Inventors: Gary Tsui, 209 W. Hermosa Dr., San Gabriel, Calif. 91775; James B. Tran, 22532 Roscoe Blvd., West Hills, Calif. 91304; Tony J. Alba, 1236 E. Michelle Ave., West Covina, Calif. 91790

[21] Appl. No.: 664,100

[22] Filed: Jun. 10, 1996

Related U.S. Application Data

[63] Continuation of Ser. No. 621,504, Mar. 25, 1996, abandoned.

[51] Int. Cl.⁶ .................................................. B23B 45/14
[52] U.S. Cl. ................................... 408/72 B; 408/97
[58] Field of Search .............................. 408/14, 72 B, 408/97, 110, 115 B, 241 B

[56] References Cited

U.S. PATENT DOCUMENTS

| | | | |
|---|---|---|---|
| 2,868,044 | 1/1959 | Chaffee et al. | 408/110 |
| 3,620,636 | 11/1971 | Godard | 408/141 |
| 4,752,158 | 6/1988 | Riley | 408/14 |
| 4,813,822 | 3/1989 | Biek | 408/14 |

Primary Examiner—Daniel W. Howell

[57] ABSTRACT

An adjustable depth drill bushing assembly in which the concentricity of the drill bushing and the mounting bushing is maintained by providing flat cylindrical mating surfaces between the drill bushing and mounting bushing, even when threads are present in the mating area. Cooperating structure is provided between the two bushings which permits both precise axial adjustment and rigid interengagement. The drill bushing is adapted to move axially of the mounting bushing in the released configuration, and is rigidly locked in place in the engaged configuration.

18 Claims, 3 Drawing Sheets

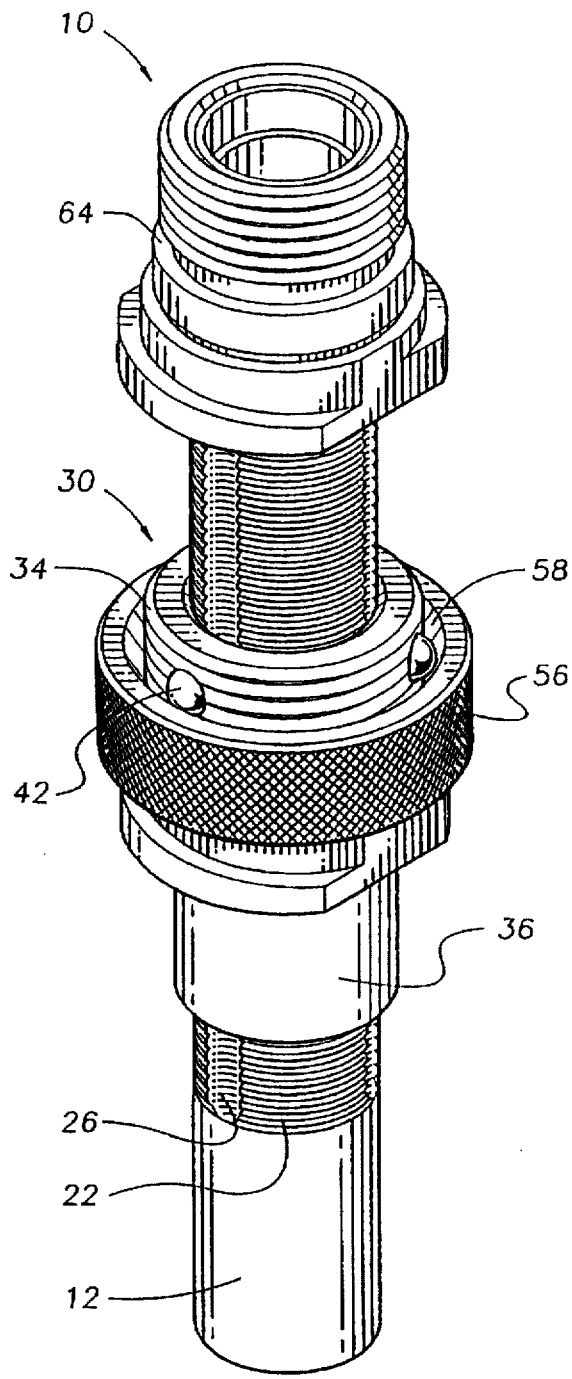
FIG. 1
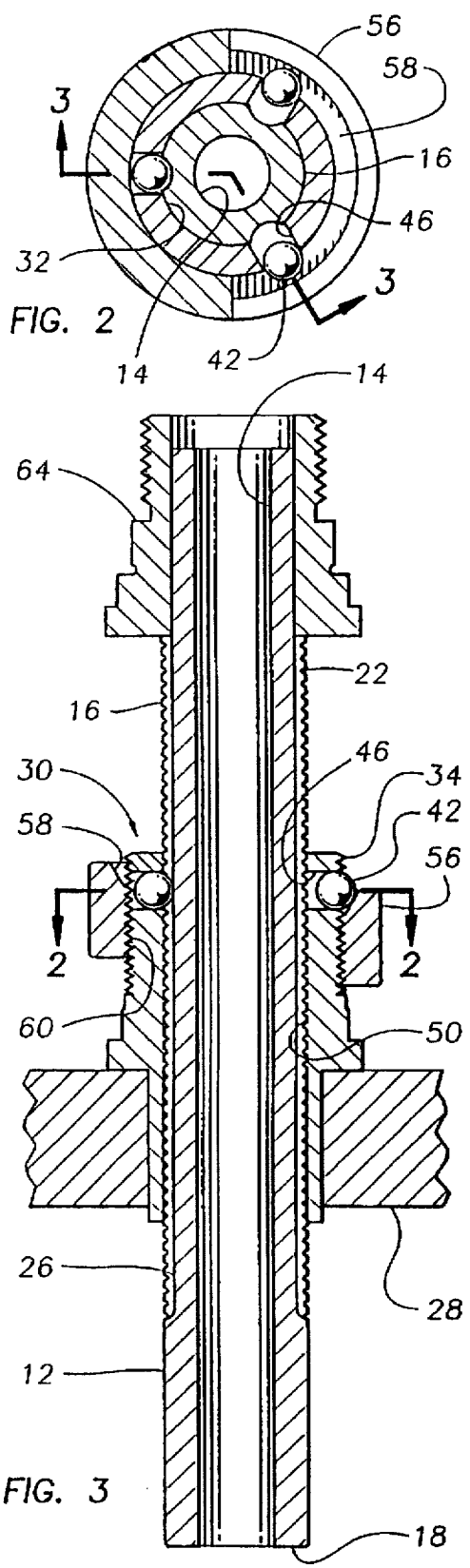
FIG. 2
FIG. 3

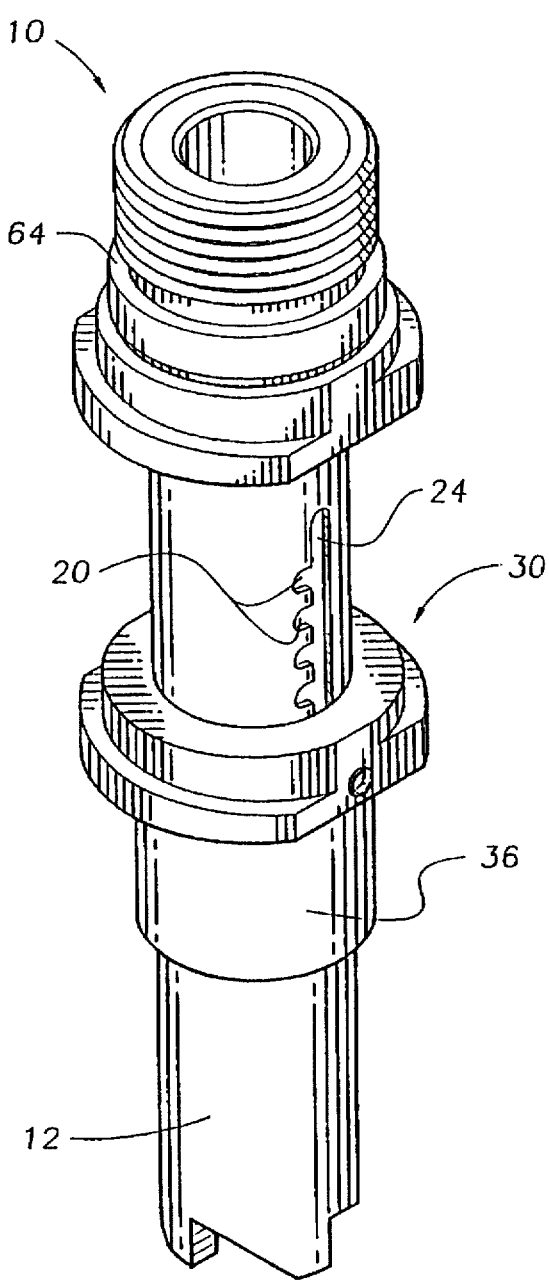
FIG. 7
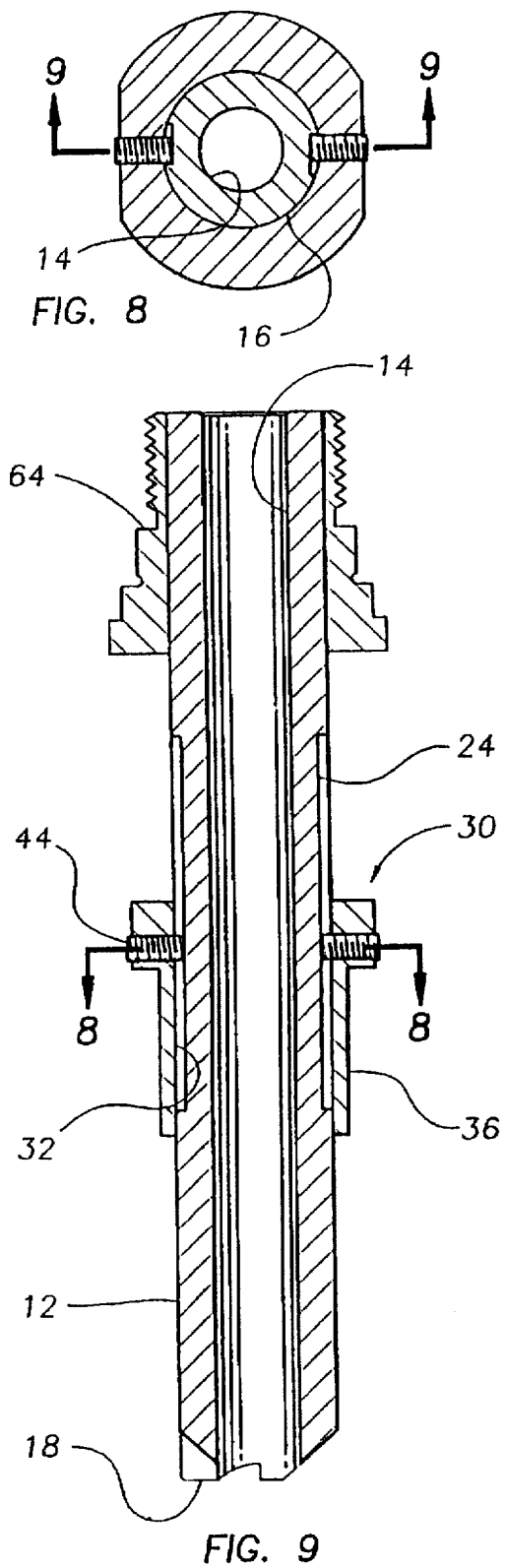
FIG. 8
FIG. 9

ADJUSTABLE DRILL BUSHING

This application is a continuation of application Ser. No. 08/621,504, filed Mar. 25, 1996, now abandoned.

FIELD OF THE INVENTION

The invention relates in general to drill bushings, and, in particular, to precision adjustable depth drill bushing assemblies.

DESCRIPTION OF THE PRIOR ART

Fixed length drill bushing assemblies where a tool driving motor mounts to the drill bushing are well know, see for example, Tsui et al, U.S. Pat. Nos. 4,770,570 and 4,841,817. In fixed length drill bushing assemblies, many lengths of tools and bushings had been required to accommodate variations in desired drilling depths and workpiece positioning. This requirement greatly increased the cost, space and handling involved in maintaining an inventory of such tools and bushings. Adjustable length drill bushing assemblies where the tool driving motor mounts to the drill bushing had been proposed. See, for example, Carlson U.S. Pat. No. 4,534,682. One deficiency in prior expedients such as those suggested by Carlson, supra, had been the inability to maintain the accuracy of an assembly. In adjustable length drill bushing assemblies, precision positioning of the tool had generally not been achieved.

According to conventional practices the tip of a drill bushing is generally spaced from the workpiece by an amount approximately equal to the diameter of the hole which is being drilled. Less clearance does not permit the removal of chips, and greater clearance degrades the precision of the hole which is drilled. Where fixed length drill bushings are used, they must be provided in a variety of lengths to permit the establishment of the necessary clearance in every situation. Also, drills, or other tools, must be provided in a variety of lengths where fixed length bushings are used. One advantage to using a combination of the right fixed length tool and bushing is that the maximum possible degree of accuracy is achieved. The provision of an adjustable length drill bushing assembly had generally been believed to result in some degradation of the precision of the assembly.

These and other difficulties of the prior art have been overcome according to the present invention.

BRIEF SUMMARY OF THE INVENTION

A preferred embodiment of the adjustable depth drill bushing assembly according to the present invention comprises an elongated cylindrical drill bushing body which has a central tool receiving bore extending axially thereof. The drill bushing body is received in the axial bore of a mounting bushing so that the mounting bushing substantially surrounds the drill bushing body in a close fitting sliding fit. The external cylindrical surface of the drill bushing body, including any threads which may be present, is ground or otherwise formed accurately concentric with the central tool guiding bore of the drill bushing body. The axial position of the mounting bushing relative to the drill bushing body is accurately adjustable. The mounting bushing is adapted to being releasably, rigidly affixed or secured to the drill bushing body at a predetermined axial position.

The mounting bushing is adapted to be mounted to a fixture. The mounting surfaces between the mounting bushing and the fixture are generally cylindrical, with a cylindrical bore being formed in the fixture at a precisely predetermined location. The accurate forming of the outer surface of the drill bushing body and the rigidity of the releasable connection between the mounting bushing and the drill bushing body serves to maintain the concentricity between the central tool guiding bore and the cylindrical bore in the fixture so that the position of any tool which passes through the central tool receiving bore is precisely controlled relative to a workpiece held in the fixture. For example, holes drilled in a workpiece may be precisely positioned both laterally and axially according to the present invention.

One end of the drill bushing body is generally provided with a driver attachment, normally a screw thread or a circular locking ramp. The driver attachment permits the bushing assembly to be connected to a driver such as a drill motor. Concentricity is accurately maintained between all of the parts so that accuracy is assured from the mounting of the bushing to the associated fixture all the way through to the central tool receiving bore of the drill bushing. To this end, all inner and outer diameters are maintained concentric with one another, and mating cylindrical surfaces between the drill bushing and the mounting bushing are provided with substantial bearing surface, even in threaded areas. Where threads are present they are formed so that the thread form of at least the male thread is flattened.

The cooperating structure which is provided between the drill bushing and the mounting bushing so as to permit the drill bushing to be moved axially of the mounting bushing and releasably locked at a desired axial location, includes releasable interlocking elements which lock the drill bushing rigidly to the mounting bushing. The cooperating structure between the drill bushing and the mounting bushing preferably takes the form of a structure formed in the external cylindrical surface of the drill bushing which mates with some structure engaging mechanism which is carried by the mounting bushing. The cooperating structure is configured so as to permit both the precise control of the relative axial positions of the parts and the releasable rigid locking of the parts together at a desired axial position. The structure engaging mechanism may conveniently include a releasable locking unit and a positioning element. In one preferred embodiment the structure formed in the external cylindrical surface of the drill bushing is a male screw thread which is adapted to mate with a female screw thread on the internal surface of the mounting bushing. Threadably moving the parts relative to one another permits the precise axial positioning of the parts relative to one another. Unlike the sharp threaded adjustment of the Carlson U.S. Pat. No. 4,534,682, the male screw thread according to the present invention is, for example, ground so that at least approximately ten percent of the area of the cylindrical surface of the drill bushing is a flat cylindrical surface. This provides an accurate bearing surface between the drill bushing and the mounting bushing. Alternatively, the parts may enjoy a slip fit which permits, generally with the aid of prepositioned stops formed in the cylindrical surface of the drill bushing, the precise axial positioning of the parts relative to one another.

In general, indentations of one kind or another are provided in the external cylindrical surface of the drill bushing which serve to releasably engage with some detente element which is carried by the mounting bushing. Preferably, the elements of the adjustable depth drill bushing assembly which provide the positioning and locking features of the invention are arranged so that the drill bushing body and the mounting bushing, in the unlocked configuration, are free to rotate relative to one another as well as to move axially.

Thus, the structure which is in the cylindrical surface of the drill bushing body is preferably located radially inwardly of that cylindrical surface. The detent element may be, for example, a set screw threaded radially through a tapped detent bore in the wall of the mounting bushing to a position where it may engage with a mating indentation on the external surface of the drill bushing body. The screw thread in the detent bore acts as a detent actuating member. In one preferred embodiment the detent element is a ball which moves freely and generally radially in a detent bore in the in the wall of the mounting bushing. The ball is trapped in the detent bore by, for example, a detent actuating member. The detent actuating member serves to hold the ball, rod, or other detent element in the detent bore, and, when tightened, to move the detent element into a releasable locking position with the drill bushing and retain it there. In one preferred embodiment the detent actuating member may take the form of a collar threadably mounted on the exterior of the mounting bushing. The inner annular surface of the collar includes a conical surface which engages with the detent element and acts as a ramp or wedge which causes the detent element to move radially as the collar is threadably moved along the surface of the mounting bushing. This threaded collar, unlike the sliding spring actuated collar of Carlson U.S. Pat. No. 4,534,682, rigidly locks the mounting bushing to the drill bushing.

In a further preferred embodiment the cylindrical external surface of the body which defines the drill bushing includes at least one channel or groove which extends generally axially of the drill bushing body along a straight or generally helical path. The channel is adapted to receive and releasably lock with a mating detent element which is carried by the mounting bushing. In one embodiment the mounting bushing and drill bushing body are configured so that there is a slip fit therebetween and generally axially spaced indentations are provided in the cylindrical surface of the drill bushing body. For ease of locating the desired indentation, the indentations may be connected together by a channel which serves to guide the detent element, in the released configuration, to the desired indentation.

Other objects, advantages, and novel features of the present invention will become apparent from the following detailed description of the invention when considered in conjunction with the accompanying drawings.

BRIEF DESCRIPTION OF THE DRAWINGS

While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

FIG. 1 is an isometric view of a preferred embodiment of the invention.

FIG. 2 is a cross-sectional view of the embodiment of FIG. 1 taken along line 2—2 in FIG. 3, with the right half of the FIG. in the released configuration, and the left half in the engaged configuration.

FIG. 3 is a cross-sectional view of the embodiment of FIG. 1 taken along line 3—3 in FIG. 2.

FIG. 7 is an isometric view of a further embodiment of the invention.

FIG. 8 is a cross-sectional view of the embodiment of FIG. 7 taken along line 8—8 in FIG. 9.

FIG. 9 is a cross-sectional view of the embodiment of FIG. 7 taken along line 9—9 in FIG. 8.

DETAILED DESCRIPTION OF THE PREFERRED EMBODIMENTS

Figure 4:
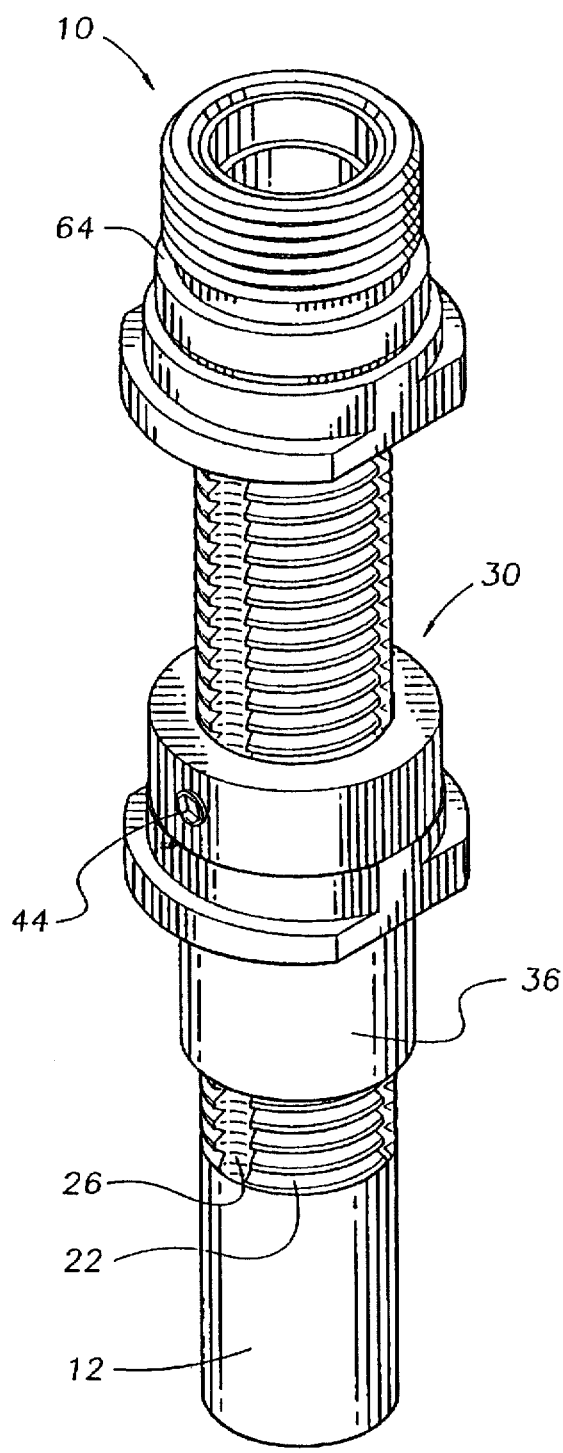
FIG. 4 is an isometric view of a further embodiment of the invention.

Referring now to the drawings wherein like reference numerals designate identical or corresponding parts throughout the several views, there is illustrated generally at 10 an adjustable depth drill bushing assembly which includes a generally cylindrical drill bushing body 12 and a mounting bushing indicated generally at 30. Drill bushing body 12 is axially received in a generally axial bore 32 of mounting bushing 30. Drill bushing body 12 is provided with a central tool receiving bore 14 which is adapted to receive a working tool, not shown. The generally cylindrical drill bushing body 12 includes an external generally cylindrical surface 16 which is generally concentric with bore 14. The thread form of the male thread on the external cylindrical surface 16 is flattened so as to provide a flat cylindrical surface for the generally axial bore 32 of mounting bushing 30 to bear against. A driver attachment 64 is provided to permit the attachment of the drill bushing assembly 10 to a conventional tool actuator or driver, not shown, such as, for example, a drill motor. The mounting bushing 30 is provided with a cylindrical external surface 36 which is adapted to be received in a mating cylindrical bore in a conventional fixture 28. The mounting bushing 30 is thus held in place within fixture 28 which is in turn affixed to a workpiece (not shown), as is customary in the art.

Because the fixture 28, the workpiece, and the mounting bushing are all affixed together in the typical tooling arrangement, the axial movement of the drill bushing body 12 relative to the mounting bushing 30 serves to move the tip 18 of body 12 relative to the workpiece. Different positionings of the workpiece in the fixture are thus accommodated. Also, different fixture-workpiece arrangements may be accommodated using the same length tool, for example, a drill bit, not shown.

The present invention provides cooperating features which permit the precision axial adjustment of the drill bushing relative to the mounting bushing. Such features include, for example, a structure in the external cylindrical surface of the body 12 which may include, for example, indentations 20 and channel or groove 24 associated with indentations 20 to aid in guiding the axial positioning of the body 12 relative to the mounting bushing 30 (FIGS. 7-9). In a preferred embodiment of this structure a male screw thread 22 is associated with indentations in the form of grooves or channels 26 (FIGS. 1–6). Cooperating with this structure in the surface of body 12 is a structure engaging mechanism which includes, for example, both a releasable locking unit and a positioning element. The releasable locking unit may, for example, take the form of a detent element such as ball 42 (FIGS. 1–3), or set screw 44 (FIGS. 4–6) received in a detent bore 46 which extends generally radially through the wall of mounting bushing 30. The positioning element may, for example, take the form of a female screw thread 50 on the generally cylindrical internal surface of mounting bushing 30 (FIGS. 1–6). Thread 50 is adapted to threadably engage male thread 22. Alternatively, the function of the positioning element may, for example, be provided by a slip fit between the body 12 and mounting bushing 30 (FIGS. 7–9).

Figure 5:
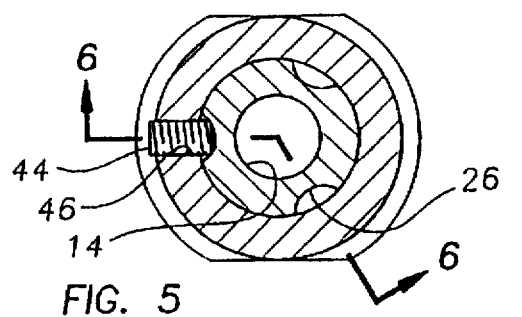
FIG. 5 is a cross-sectional view of the embodiment of FIG. 4 taken along line 5—5 in FIG. 6.
Figure 6:
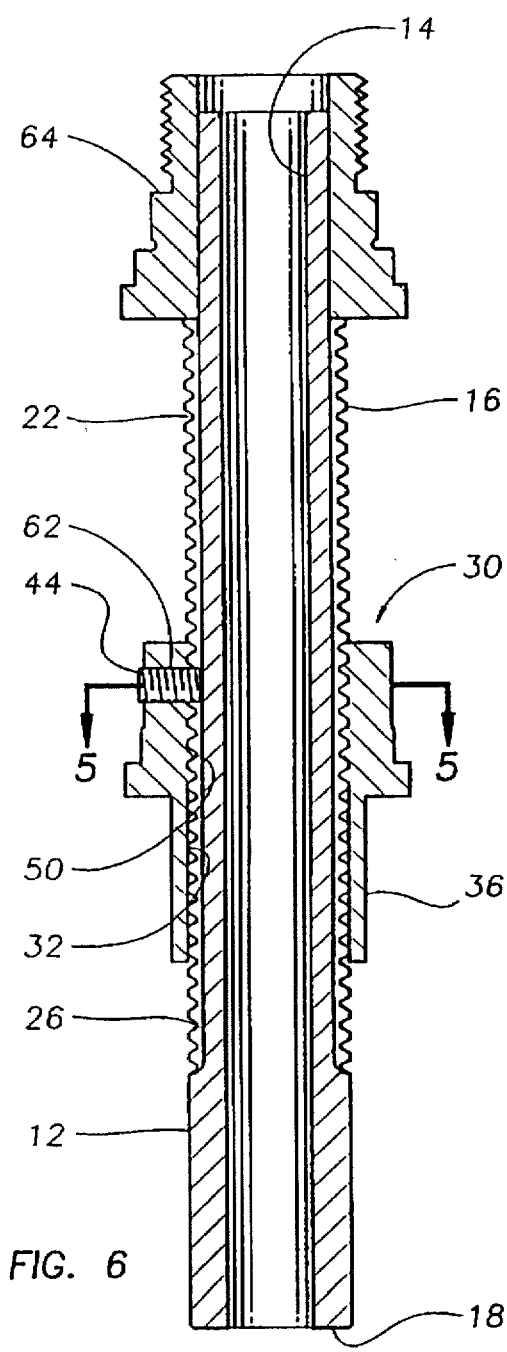
FIG. 6 is a cross-sectional view of the embodiment of FIG. 4 taken along line 6—6 in FIG. 5.

A detent actuating member is provided, for example, to energize the detent element, by, for example, moving it between engaged and disengaged positions with the structure in the cylindrical surface 16. In one preferred embodiment (FIGS. 1–3) the detent actuating element takes the form of a collar 56 which surrounds the mounting bushing 30. Collar 56 is conveniently provided with an internal screw thread 60. Internal thread 60 is adapted to threadably engage with external screw thread 34 on mounting bushing 30 for axial movement relative to mounting bushing 30. Collar 56 is provided with an internal conical surface 58 which serves to engage with a detent element. In the collar position shown on the right hand half of FIGS. 2 and 3, collar 56 loosely retains the detent element in the detent bore. In this released position the collar 56 permits the detent element, for example, ball 42, to float in detent bore 46 out of engagement with indentation 26 so that the drill bushing may be threadably moved relative to mounting bushing 30. When collar 56 is threadably advanced axially along mounting bushing 30, the internal conical surface 58 wedges against the detent element and forces it radially into engagement with an adjacent indentation 26 in the structure in the surface of body 12 and locks it rigidly in place. This engaged configuration is shown, for example, on the left side of FIGS. 3 and 4. It will be understood by those skilled in the art that while for the sake of convenience, FIGS. 3 and 4 illustrate both of these configurations, the internally threaded collar 56 as actually used is as shown in FIG. 1. Relative movement between the drill bushing and the mounting bushing is thus prevented in the engaged configuration. The function of the detent actuating member may also be provided, for example, by a screw thread 62 in the detent bore when a set screw is used as the detent element (FIGS. 4–6). In any event, the engagement is such that the mounting bushing is rigidly locked to the drill bushing.

The axial adjustment of the drill bushing relative to the mounting bushing is precisely controlled by, for example, threadably engaging these parts and providing detent engaging indentations at a plurality of locations. Thus, longitudinally extending grooves, channels or indentations 26 are preferably provided at several circumferentially spaced locations around body 12. If the screw thread, for example, is such that one full revolution moves the drill bushing axially 0.060 of an inch relative to the mounting bushing, the provision, for example, of 4 grooves 26 permits the axial positioning of these parts relative to one another in axial increments of 0.015 of an inch. In the embodiment of, for example, FIGS. 7–9, the axial spacing of indentations 20 determines the locations at which the parts may be axially positioned relative to one another. In this embodiment the groove or channel 24 serves to guide the tip of the set screw 44 between the indentations 20.

The serrated edge of the tip 18 of the embodiment of FIGS. 7–9 serves as a chip breaker.

Obviously many modifications, substitutions, variations, reversals of parts, and the like, of the present invention are possible in light of the above teachings. It is therefore to be understood that, within the scope of the appended claims, the invention may be practiced otherwise than as specifically described with reference to those preferred embodiments set forth herein without departing from the spirit and scope of the accompanying claims.

What is claimed is:

1. An adjustable depth drill bushing assembly comprising:
   a drill bushing having a generally cylindrical body, a central tool receiving bore and a generally cylindrical external surface generally concentric with said central tool receiving bore;
   a mounting bushing adapted to being mounted in a fixture and having a generally axial bore, said cylindrical body being axially adjustably receivable in said axial bore;
   a structure formed in said external surface, said external surface including a flat cylindrical surface mating with said generally axial bore; and
   a structure engaging mechanism operatively engaged with said structure and carried by said mounting bushing, said structure engaging mechanism including a releasable locking unit and a positioning element, said positioning element cooperating with said structure to accurately position said cylindrical body axially relative to said mounting bushing, and said releasable locking unit being adapted to releasably lock said mounting bushing rigidly to said cylindrical body.

2. An adjustable depth drill bushing assembly of claim 1 wherein said structure comprises a male thread having a flattened thread form.

3. An adjustable depth drill bushing assembly of claim 1 wherein said structure comprises at least two indentations spaced axially of one another.

4. An adjustable depth drill bushing assembly of claim 1 wherein said structure comprises a generally axially extending groove connecting at least two axially spaced indentations.

5. An adjustable depth drill bushing assembly of claim 1 wherein said structure includes a male thread and at least one axially extending channel.

6. An adjustable depth drill bushing assembly of claim 1 wherein said positioning element comprises a female thread.

7. An adjustable depth drill bushing assembly of claim 1 wherein said positioning element comprises a slip fit between said axial bore and said external surface.

8. An adjustable depth drill bushing assembly of claim 1 wherein said releasable locking unit comprises a set screw threadably received in said mounting bushing.

9. An adjustable depth drill bushing assembly of claim 1 wherein said structure comprises at least one generally axially extending channel and said releasable locking unit comprises at least one detent element, said detent element being generally radially moveable between an engaged position where it is locked with said axially extending channel and a released position where it is not locked with said axially extending channel.

10. An adjustable depth drill bushing assembly of claim 9 wherein said releasable locking unit includes a detent actuating member moveable between a first position where it holds said detent element in said engaged position and a second position where it releases said detent element to said released position.

11. An adjustable depth drill bushing assembly of claim 10 wherein said detent actuating member is threadably mounted and is threadably moveable between said first and second positions.

12. An adjustable depth drill bushing assembly comprising:
   a drill bushing including a generally cylindrical body having a central tool receiving bore and a generally cylindrical external surface generally concentric with said central tool receiving bore;

a mounting bushing adapted to being mounted in a fixture and having a generally axial bore, said cylindrical body being axially adjustably receivable in said axial bore;

a structure formed in said external surface, said structure including at least one generally axially extending channel and a male thread having a flattened thread form; and a structure engaging mechanism operatively engaged with said structure and carried by said mounting bushing, said structure engaging mechanism including a releasable locking unit and a female thread, said female thread being threadably engaged with said male thread and being adapted to threadably position said cylindrical body and axially relative to said mounting bushing, and said releasable locking unit including at least one detent element mounted to said mounting bushing, said detent element being moveable between an engaged position where it is rigidly and lockably engaged with said channel and a released position where it is released from engagement with said channel.

13. An adjustable depth drill bushing assembly of claim 12 wherein said structure engaging mechanism includes a detent actuating member mounted for movement between a first position and a second position, said detent actuating member retaining said detent element in said engaged position when said detent actuating member is in said first position and releasing said detent element when in said second position.

14. An adjustable depth drill bushing assembly of claim 13 wherein said detent element comprises a ball, said detent actuating member comprises a collar threadably mounted on the exterior of said mounting bushing, said ball being received in a detent bore in said mounting bushing and trapped in said detent bore by said collar, and said collar being positioned to wedgedly engage said ball in said first position.

15. An adjustable depth drill bushing assembly comprising:

a drill bushing including a generally cylindrical body having a central tool receiving bore and a generally cylindrical external surface generally concentric with said central tool receiving bore;

a mounting bushing adapted to being mounted in a fixture and having a generally axial bore, said cylindrical body being axially adjustably receivable in said axial bore;

a structure formed in said external surface, said structure comprising a male thread having a flattened thread form and a generally axially extending channel; and a structure engaging mechanism operatively engaged with said structure and carried by said mounting bushing, said structure engaging mechanism including a releasable locking unit and a female thread, said female thread being adapted to threadably engage said male thread, and said releasable locking unit comprising a set screw threadably mounted in said mounting bushing and positioned to selectively rigidly engage and release said channel.

16. An adjustable depth drill bushing assembly comprising:

a drill bushing including a generally cylindrical body having a central tool receiving bore and a generally cylindrical external surface generally concentric with said central tool receiving bore;

a mounting bushing adapted to being mounted in a fixture and having a generally axial bore, said cylindrical body being axially adjustably receivable in said axial bore;

a structure formed in said external surface, said structure comprising at least two indentations axially spaced apart; and a structure engaging mechanism operatively engaged with said structure and carried by said mounting bushing, said structure engaging mechanism including at least one detent element mounted to said mounting bushing, said detent element being moveable between an engaged position where it is lockably engaged with said indentations and a released position where it is released from engagement with said indentations.

17. An adjustable depth drill bushing assembly of claim 9 wherein said generally axially extending channel comprises a generally helical groove.

18. An adjustable depth drill bushing assembly of claim 1 including a driver attachment on one axial end of said cylindrical body, said driver attachment being adapted to permit the mounting of said drill bushing assembly to a driver.

* * * * *